June 2, 1964
C. W. REED ETAL
3,135,865
NON-DESTRUCTIVE METHOD FOR TESTING BODIES
FOR PENETRABILITY BY PARTICULATE MATTER
Original Filed April 12, 1955
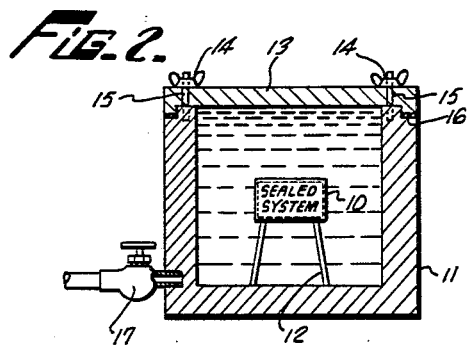
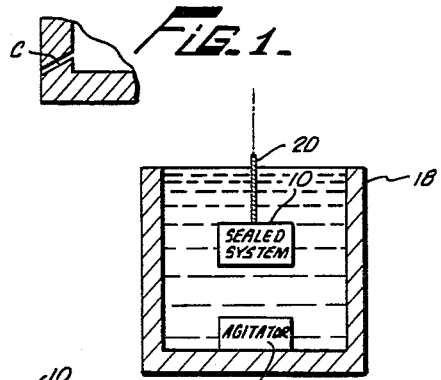
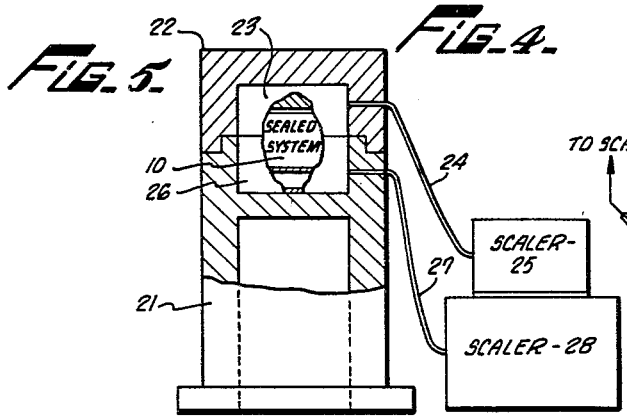
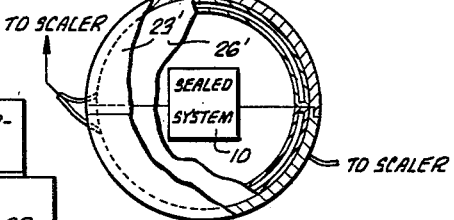
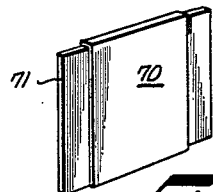
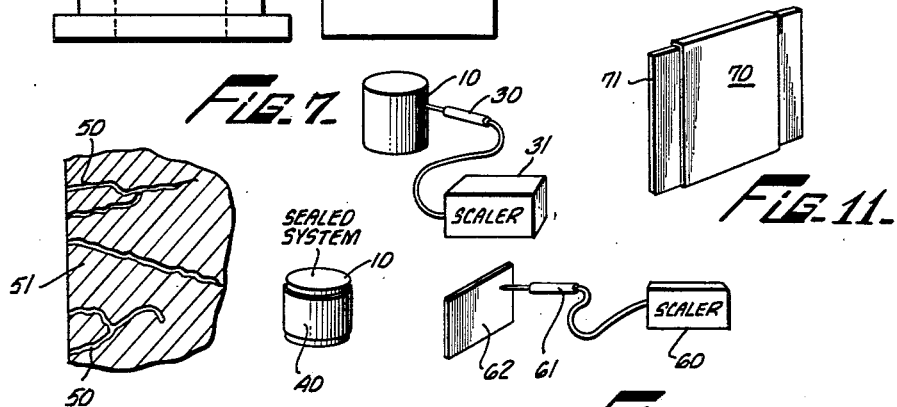
INVENTORS.
CLIFTON W. REED
BENEDICT CASSEN
BY
ATTORNEYS.

ent Office 3,135,865
Patented June 2, 1964

3,135,865
NON-DESTRUCTIVE METHOD FOR TESTING BODIES FOR PENETRABILITY BY PARTICULATE MATTER
Clifton W. Reed, Redondo Beach, and Benedict Cassen, Pacific Palisades, Calif., assignors, by mesne assignments, to Consolidated Electrodynamics Corporation, Los Angeles, Calif., a corporation of California
Continuation of application Ser. No. 500,728, Apr. 12, 1955. This application Jan. 4, 1961, Ser. No. 80,616
10 Claims. (Cl. 250—83)

This invention is directed generally to a method for determining the penetration of matter into bodies or objects through the utilization of certain radioactive phenomena and is, in a primary illustrative application, more particularly concerned with a method for non-destructively testing sealed systems, e.g., evacuated instrument bellows, for leaks.

In many instances, it is desirable or highly important to determine the penetration of matter into voids or chambers within bodies or objects through surface connected leakage paths and quite often this determination necessitates the detection, measurement, or location of matter entrained in spaces within the body which are inaccessible from the standpoint of accomplishing such determination non-destructively by coaction of the entrained matter with suitable reagents or by direct detection or measurement techniques.

This application is a continuation of our co-pending application Serial No. 500,728, filed April 12, 1955, now abandoned.

It may, therefore, be stated as the general object of the invention to provide a non-destructive method for determining externally of a body the penetration extent, and/or location of matter into surface connected fissures, voids or chambers within the body.

The present method is especially suited to, and the primary illustrative application of the invention is concerned with, the detection and measurement of leaks in hollow sealed objects or systems such as evacuated instrument bellows.

Existing methods for testing or checking sealed systems for leaks have a low degree of accuracy and are excessively time consuming and costly in their practice, especially where such leaks are relatively small, owing to the fact that such methods are, in general, based on the direct detection of fluid flow or change in pressure or weight, or are destructive in their application. Moreover, the apparatus employed to carry out the existing methods of leak detection are relatively complex in construction, costly to manufacture, and are exacting and require substantial skill in their use. In many instances it is desirable and often highly important to detect leaks of a rate so small as to be impossible of detection by existing methods, or whose detection may not be practically feasible because of the large time element involved.

A more specific object of the invention is accordingly the provision of an improved method for testing hollow sealed objects or systems for leaks, which method is effective to determine leaks of substantially smaller size more quickly and with greater accuracy than has heretofore been possible or feasible, and which may be practiced with relatively simple and inexpensive apparatus that may be readily operated by persons having a minimum of training.

*Definitions*

Certain terms and expressions, pertaining principally to the field of nuclear physics, will be employed in the ensuing description of the invention and in the appended claims, and it is considered to be advantageous to set forth, at the outset, the definitions which are herein given to such terms and expressions.

The term "molecule" is to be understood as referring to the smallest unit particle of ordinary matter and may consist of one or more like or unlike atoms.

The expression "molecules of matter" or simply "molecules" is applied in a generic sense to a plurality of molecules as they exist in the liquid or gaseous states of matter, wherein the individual molecules, being relatively unrestricted by cohesive forces, are free to change their positions with respect to each other, as well as to a plurality of molecules as they exist in the solid state of matter wherein a plurality of such molecules are bound together by cohesion to form particles or bodies of solid matter.

The phrase "molecules of fluid matter" or merely "fluid matter" will be applied in those instances wherein reference is had solely to liquid and/or gaseous substances, while "molecules of fluidic or fluidized matter" or simply "fluidic or fluidized matter" will be applied, in a generic sense, to encompass substances in a liquid or gaseous state, colloidal suspensions, and solid matter which is sufficiently well divided as to form fluent solid substances.

"Nuclear radiations" will be applied to the forms of atomic radiation which are caused by instability of the nucleus, or which have their origin in the nucleus, such as alpha rays, beta rays, neutrons, protons, positrons, and photons including gamma and annihilation radiations and emissions resulting from the process of K-electron capture.

As is well known, some forms of radiation, such as alpha and beta rays, for example, have very limited ranges in most materials and are stopped by relatively thin sections of such materials, while other forms of radiation, as for example, gamma rays and neutrons, have relatively great ranges and may be detected through substantial thicknesses of the same materials. The ranges of various radiations in most materials may be had by reference to appropriate literature in the field of nuclear energy.

In this specification, the expression "low range" as applied to either atomic or nuclear radiations encompasses those radiations which are moderately to totally absorbed by a given wall, or given thickness of material, through which penetration is to be determined; while the expression "high range," as similarly applied, encompasses those radiations which are moderately to totally transmitted through the same wall, or thickness of material.

*General Description of Invention*

The present method of determining penetration or penetrability involves in its primary form the use of fluidic matter at least some of whose molecules are comprised of atoms or atomic nuclei capable of yielding high range radiations, as heretofore defined. Assume a body or object having an internal void or chamber and a very fine opening leading inwardly through the wall of the body to such void or chamber. Such body might be, for instance, a sealed, evacuated instrument bellows, or as one additional preliminarily mentioned example, it might be a solid casting having an imperfection consisting of a surface connected fissure, or a small void connected by a fine passage or fissure with the surface. This body or object is exposed to or contacted by the prepared fluidic matter, as by immersion, with the consequence that some molecules of the latter penetrate the assumed fine opening and become entrained therein or in the void or chamber within the body. This penetration may be due, for example, to an existing or an impressed pressure differential, kinetic energy of the molecules, or capillary action. The present method proposes the detection, location, and/ or quantitative measurement of these entrained molecules by detecting or determining the intensity of the high range radiations emitted thereby.

In practice of the invention, the body, e.g., a sealed system such as an evacuated instrument bellows, is immersed in or exposed to fluidic matter of the above character, which is preferably under greater pressure than the internal pressure of the system. During this period of exposure or immersion, molecules of the fluidic substance move through any crack or openings which might exist in the wall of the system or through any natural pores in the material from which the wall is made and became entrained within the system. The entrained molecules, if any, are then detected or measured from outside the body by radiation techniques. Such detection or measurement will, therefore, be indicative of the existence of a leak in the system, and, as will be seen, may be made to yield the leakage rate with a relatively high degree of accuracy, and in other instances can yield the location of the defects or leakage points.

The preferred practice of the invention contemplates submitting the exterior surfaces of the system to certain decontamination procedures following its exposure to the fluidic matter, so that the radiation count taken will be exclusively attributable to the entrained molecules. Such procedures, however, may not be, and generally are not, completely effective to remove all surface and porous contaminants. It will be apparent that the high range radiations from these surface contaminants will be detected or counted along with the high range radiations emitted by matter entrained within the system. Such surface and porous radiations provide, therefore, a potential source of error in the final test determination, and, accordingly, to obtain leakage determinations having a relatively high degree of accuracy, the intensity of these latter radiations must be accurately ascertained.

A highly important feature of the invention, and one which accomplishes this high degree of accuracy, involves a unique use of materials yielding both high range and low range radiations to obtain an accurate indication of the extent of the surface and porous contamination of the system.

This feature of the invention involves generally the immersion of the system in or exposure of the system to fluidic matter comprised of molecules capable of emitting or yielding both high range and low range radiations. After immersion, both high and low range radiation counts are taken. The high range radiation count will be due to molecules which have leaked into and become entrained within the system as well as to the external surface and porous contaminants, while the low range radiation count will be due solely to the external surface and porous contaminants since, by definition, the low range radiations emitted by any entrained molecules will be absorbed in the material of the system wall.

Knowing the total internal and external high range radiation count and the external low range radiation count, the external high range radiation count may be obtained from a knowledge of the emission ratio of the high and low range radiations as will be hereinafter more fully described.

The invention, briefly outlined above, as well as objects and features not preliminarily mentioned, will be more fully understood by the reading of the following detailed description of the invention, reference for this purpose being had to the accompanying drawings wherein:

FIG. 1 is an enlarged view, in section, of a fragmentary portion of the wall of a hollow sealed system having a leak;

FIGS. 2–6 diagrammatically illustrate certain forms of apparatus suitable for carrying out the preferred practice of the invention; and FIGS. 7–11 diagrammatically illustrate additional applications of the invention.

*Leak Detection*

In accordance with the preferred practice of the present method, the sealed object or system to be tested or checked for leaks is immersed in or exposed to fluidic matter containing at least some molecules whose atoms or atomic nuclei are capable of emitting high range radiations. Generally speaking, the system or object to be tested can most easily be bodily immersed in the fluidic medium, but it will be understood that if only a portion of the object or system need be tested, it is sufficient if only that portion be immersed or exposed. It will therefore be understood that reference to immersion or exposure to the fluidic medium denotes either total immersion or exposure, or immersion or exposure of at least that portion of the system or object which is to be tested, as the case may be. This fluidic matter is preferably, although not necessarily, under greater pressure than the internal pressure of the system to increase the rate at which leakage, if any, into the system will occur. If the sealed system is highly evacuated, sufficient pressure differential may exist if the fluidic matter is at atmospheric pressure. In many cases, however, it is highly desirable to elevate the pressure of the fluidic matter.

The hollow sealed system may comprise, for instance, a hollow permanently sealed article or object, such as an evacuated instrument bellows, which is to be tested for wall leaks such as may result from wall cracks, imperfectly soldered or brazed joints, or faulty seals. As another example, the system may comprise a hollow article or body which has been temporarily sealed for the purpose of conducting a penetrability or porosity test on the wall material thereof.

The fluidic matter employed in the test may consist entirely of a substance whose molecules comprise atoms or atomic nuclei capable of radiating high range detectable radiations, such as a solution consisting solely of certain radioactive isotopes. It is, however, preferable, in view of the present high cost of radioactive substances and the dangers involved in their handling that the matter be only partly made up of, i.e., tagged with, such a substance. Thus, the fluidic matter may comprise an iodine solution tagged with the radioactive iodine isotope $I^{131}$.

It will be apparent, of course, that the molecules whose atoms or atomic nuclei are capable of radiating detectable radiations may be derived from a solid substance, as for example, where a solid containing such molecules is soluble in a liquid or will or may be made to pass to a fluid phase under given conditions; or they may be in the form of a finely divided solid.

Those molecules whose atoms or atomic nuclei are capable of emitting or yielding detectable radiations may be divided into three general groups according to the manner in which they yield the desired radiations. Matter comprising these various types of molecules are outlined below and designated by suitable symbols for facility of reference in the subsequent description.

Group A: In this group is placed matter containing molecules whose atoms or atomic nuclei are unstable and which, upon decay to more stable nuclei, emit detectable radiations of the type desired. An example of this type of matter is demonstrated by radioactive iodine of mass number 131 which decays with a half life of 8.14 days by beta and gamma emission to stable xenon of mass number 131. In this example the principal gamma radiation has an energy of .364 mev. and represents the highly penetrating, that is, high range, electromagnetic radiation. The principal beta radiation has an energy of 0.60 mev., but because it is particulate and charged it is readily absorbed in matter and hence represents the low range type of radiation. The iodine-131 may occur by itself in the medium as atoms or molecules or may be a part of a molecule such as methyl iodide $CH_3I$. Two or more kinds of radioactive atoms may also be used, one for high range radiation, and another for low range radiation, and these may be joined in molecules of a single kind, or be present in molecules of different kinds. For example, molecules containing phosphorous atoms may be used as a beta ray source, and molecules containing cobalt may be used as a gamma ray source. Or a molecule containing both phosphorous and cobalt may be used.

Group B: In this group is placed matter containing parent molecules whose atoms or atomic nuclei are capable of yielding the desired nuclear radiations by first undergoing a change to another and more stable form of atom or atomic nuclei. Thus, in this case, the atoms or atomic nuclei of the parent molecules are unstable and decay, with the resultant emission of unuseful low range radiations such as beta rays, to daughter elements whose atoms or atomic nuclei are also unstable and which upon further decay to more stable nuclei emit high range radiations suitable to the practice of the invention. Of course, the process may carry on through a number of "generations." An example of such a parent radioactive material which produces, as a result of natural decay, a daughter product having the useful properties is cited in the case of radioactive cesium-137 having a half life of 37 years and decaying principally by beta emission of 0.51 mev. energy to unstable barium-137 which is the daughter product. The excited or unstable barium-137 arrives at stable barium-137 by emission of a 0.669 mev. gamma ray. This is a penetrating, high range radiation of a useful type. It will be clear that a great variety of combinations of parent and daughter atoms may be employed to advantage. And within this variety are cases where the parent may serve to provide one of the desired forms of radiation, and the daughter another. There may also be used multiple parent and daughter elements, as where the desired high and low range radiations are obtained from daughter elements obtained from different parent elements.

Group C: In this group is placed matter which contains molecules whose atoms or atomic nuclei are stable but which may be induced to emit or yield, either over a period of time or instantaneously, desired high range radiations under certain conditions, as under neutron bombardment. The radiations emitted must, as will be apparent, be distinguishable from radiations that may be emitted as a result of irradiation of the material of the system wall under such bombardment. The half life, form of radiations, and/or energy of the radiations may serve as distinguishing characteristics. An example of induced activity over a period of time is given by a situation whereby radioactive materials are artificially produced in a reactor by the exposure of a stable element such as cobalt-59 to a source of neutrons. Absorption of a neutron converts stable cobalt-59 to radioactive cobalt-60 which has a half life of 5.2 years decaying principally by beta emission of 0.31 mev. energy and two principal gamma rays of 1.17 and 1.33 mev. to stable nickel-60. Although the walls of the container may be induced to radio activity, the radiation produced by the cobalt-59 within the enclosure can be identified by means of the type of radiation, energy of the radiation, and/or the half life of the decay process. Also, an immersion material is generally chosen to give selectively greater absorption of the inducing radiation than the walls of the container afford.

The absorption of a neutron by stable cadmium-113 with the immediate release of energy in the form of gamma radiation, which is termed a radioactive capture process, is an example of instantaneously induced radiation. The radiated gamma rays can be selectively detected and the amount of cadmium-113 present can be established.

During the aforementioned immersion of the sealed system in or exposure of the system to the fluidic matter employed in the test, molecules of such matter penetrate through any openings that may exist in the wall of the system by virtue of the pressure differential, if such exist, across the wall, and/or as a result of the kinetic energy and motion of the molecules. Those molecules which succeed in penetrating the wall become entrained within the system. The openings through the wall of the system, an enlarged fragmentary section of which is illustrated in FIG. 1, may be in the form of defects, such as cracks, as shown in C in FIG. 1, or may be the natural pores in the material from which the wall is made, and, moreover, it will be apparent that such penetration may, since it involves molecules of matter in the fluidic state, occur through extremely small openings or surface connected defects.

After immersion or exposure of the system for a desired or predetermined period of time, depending upon the test accuracy demanded, and upon whether the test is to be qualitative or quantitative, the external surface and pores of the system are subjected, if high accuracy be desired, to any suitable decontamination procedure, such as immersing the system in suitable well known decontamination solutions, to remove as much as practically possible of the fluidic matter adhering to the external surface or absorbed in the external pores of the system.

In order to determine the effectiveness of these decontamination procedures and to ascertain the point beyond which further decontamination will have little or no effect, samples of the decontamination solution may be subjected to periodic radiation counts. Repeated cleansing operations which yield successive, substantially equal counts will be indicative of the ineffectiveness of further decontamination.

In those tests utilizing either Group A or B fluidic matter, the system is now subjected to a radiation count, as described below, it being understood, of course, that in the case of Group B matter, sufficient time will be permitted to elapse to allow for the decay to the desired daughter elements.

In those tests employing Group C fluidic matter, however, the system is subjected to the further procedures necessary to induce atoms or atomic nuclei of molecules entrained in the system to emit radiations. As was heretofore mentioned, the material of the wall may also be induced to radioactivity by such procedures, and it is essential, therefore, that the fluidic matter be tagged with molecules whose radiations are disinguishable from those of the system wall. It will be apparent that the use of fluidic matter of the types included in Groups B and C is advantageous from a health and safety aspect since in such cases, the greater portion of the test may be carried out while the fluidic matter is in a less hazardous state.

Assuming first that the fluidic matter was tagged with only a high range radiation emitter of that only high range radiations may be counted with the equipment used, a scaler or radiation counter is employed which has primary sensitivity to such high range radiations, to detect, count and/or locate the internal source of the high range radiations emanating from the system. Where, for example, the fluidic matter was tagged with molecules whose atoms emit gamma radiations, the detection device may comprise a conventional scintillation counter which is primarily sensitive to such gamma radiations.

The count thus obtained will be due to those molecules which have penetrated and become entrained in the system, as a result of leaks in the wall of the latter, as well as to any remaining surface and porous contaminants. The effect of such surface and porous contaminants may be regarded as negligible, especially if the decontamination procedures, when employed, are known to be very effective, and the radiation count obtained may be attributed to the leakage of fluidic matter into and hence to leaks in the system.

To provide further assurance that the surface contaminants have been reduced to a minimum, the system may be subjected to additional decontamination procedures and periodic high range radiation counts taken on the system. When these subsequent counts become relatively constant, it may be assumed that the external surface and pores have been decontaminated, and that the high range radiation count obtained is indicative of only those molecules of fluidic matter which have leaked into the system.

A highly important form of the invention includes the following procedure for precisely ascertaining the extent of surface and porous contamination. The fluidic matter is tagged with molecules whose atoms or atomic nuclei will emit or yield, either in their original state, or via parent or daughter elements, or multiple parent and/or daughter elements, or following bombardment by certain penetrative radiation, both high and low range radiations, such as alpha and gamma radiations, for instance. That is to say, speaking broadly, and taking into account the definitions heretofore given, substances are selected which will produce high and low range radiations for the wall thickness and wall material of the system in hand. In still simpler language, the substance used will produce certain radiations penetrative of the wall, and other radiations non-penetrative of the wall. The atoms or atomic nuclei of each of the molecules may emit such high and low range radiations, or the atoms or atomic nuclei of some of the molecules may emit high range radiations which the atoms or atomic nuclei of others of the molecules may emit low range radiations.

As before, the system is immersed in or exposed to the fluidic matter and molecules of the latter penetrate into and become entrained in the system through any openings existing in the wall thereof. After removal of the system from the matter, partial or total decontamination of its external surface, and, in the case of Group C fluidic matter, submission to neutron bombardment or other procedures necessary to induce radiation from the atoms of entrained molecules, both high and low range radiations emanating from the system are detected or counted by suitable counting devices having primary sensitivity to the high and low range radiations, respectively. Thus, if the high range radiations are gamma rays, a conventional scintillation counter may be employed and if the low range radiations are alpha or beta rays, for example, they may be counted with a Geiger counter.

The high range radiation count thus obtained will, as in the prior test utilizing only a high range radiation emitter, be due both to internal and external molecules which emit radiations.

The "low range" radiation count will, however, be due only to the contaminants adhering to the surface of the system and absorbed in the external pores of the system to such a depth that the radiations from such porous contaminants will not be stopped by the material of the system wall.

As is well known in the field of nuclear physics, the high and low range emissions from radioactive matter bear a definite ratio or relationship to each other, which emission ratio or relationship may be readily determined either experimentally or by reference to suitable literature on the subject.

Thus, for example, where the high and low range radiations are, respectively, gamma and beta radiations, one might choose an isotope or isotopes resulting in one beta emission count for every two gamma emission counts.

Therefore, for every low range radiation count obtained from the system, the corresponding number of high range radiations emitted from the surface and pores of the system may be calculated. Knowing this surface high range radiation count, the net high range radiation count due to those molecules of fluidic matter which have leaked into the system may be readily ascertained with a relatively high degree of accuracy by deducting the external high range count from the total high range count.

To account for the effects of earth and cosmic radiations, if the test accuracy demanded is such as to warrant such an accounting, a system, which has not been immersed, may be subjected to a count of the form or forms of energy radiations to be employed in the test. This background count may then be subtracted from the count obtained as above during the test to obtain a more accurate net count of the radioactive molecules within the system.

Radiation spectrographic techniques may also be applied to advantage to eliminate the effects of background radiation. Thus, in such cases, radiation spectrographs are connected in the counting circuits employed and adjusted to discriminate between the radiations employed in the test and the background radiations on the basis of differences in their energy and/or their forms. The radiations emanating from the system are then counted to the exclusion of background radiations. Where, for example, gamma and beta rays are employed in the leak detection test, gamma and/or beta ray spectrographs may be used.

The radiation count obtained in accordance with any one of the procedures outlined above may serve only as a basis for detecting leakage in the system. If, however, a quantitative determination or measurement of such leakage is desired, the same is obtained through the application of certain well known calculational procedures involving the net radiation count, the constants of the system, such as its size, shape, etc., the pressure differential during immersion, and the time of immersion. These procedures involve the laws of probability and are conventional in the field of nuclear physics. Experimental procedures may also be applied by standardization against systems having known leakage rates.

*Apparatus*

Apparatus for carrying out the foregoing preferred practice of the invention is diagrammatically illustrated in FIGS. 2–6 of the drawings.

As shown in FIG. 2, the fluidic matter in which the sealed hollow system 10 (an evacuated instrument bellows, for example) is immersed or to which the system is exposed, is contained within a vessel 11, the system preferably resting on a support 12 so that substantially the entire surface of the system will be exposed to the matter. It may, as was indicated, be desirable in some tests to pressurize the fluidic matter, and to this end vessel 11 is provided with a removable closure 13 which is releasably secured to vessel 11 as by fastening means 14, 15. A gasket 16 is preferably disposed between the closure and vessel as shown. Moreover, the vessel is shown to include a valved inlet 17 to provide for the introduction of fluidic matter into the vessel.

Decontamination of the exterior surfaces of the system 10, when practiced, is preferably carried out, as shown in FIG. 3, by repeatedly immersing the system in a suitable decontamination bath contained in a vessel 18, which solution may, if found desirable in any given use, be agitated by sonic or super sonic vibrations, jets, or mechanical means generally indicated at 19. Hot or cold cleansing solutions may also be used. System 10 is suspended from a cord 20 or the like to permit such repeated immersing thereof.

In those tests employing type C fluidic matter, the system is, as previously indicated, subjected to procedures necessary to induce radiations from any molecules of the matter which have, during immersion, leaked into the system. This step is indicated in FIG. 4.

One form of apparatus for obtaining the count of the hard or hard and soft radiations emanating from the system, in the final step of the aforedescribed method, is shown in FIG. 5. This apparatus comprises a hollow housing 21 having thick walls of lead or other material relatively opaque to earth, cosmic and other forms of extraneous radiations present in the vicinity of the test.

Housing 21 has an open end closed by a removable, hollow, thick wall cap 22 wherein is mounted a first radiation sensitive element 23, of generally inverted cup shape, which has primary sensitivity to the particular form of high range radiations employed in the test. This sensitive element is coupled, through a lead 24, to an appropriate scaler or radiation counting device 25 of any conventional type.

A second radiation sensitive element 26, of generally cup shape and having primary sensitivity to the particular form of low range radiations employed in the test, is mounted within the housing and coupled through a lead 27 to a second scaler or radiation counting device 28. As previously indicated, where beta and gamma rays are employed in the test, sensitive element 23 may comprise the crystal of a scintillation counter and sensitive element 26 may comprise a Geiger tube.

To obtain a radiation count, system 10 is disposed within sensitive elements 23 and 26, as shown, and the intensities of the high range or high and low range radiations emanating from the system may be read from suitable scales (not shown) embodied in the counting devices 25 and 28.

It is desirable to enclose as much of the system as is possible by the radiation sensitive elements since the counting rate and hence the test accuracy will then be greater. In the ideal case the sensitive elements of the counting devices completely enclose the system 10 as indicated in FIG. 6 wherein the high range sensitive element 23' and low range sensitive element 26' are shown as spheres enclosing the system 10, the spheres being formed in two separable parts to permit the insertion and removal of the system. Leads from each elements extend to counting devices as shown.

*Additional Applications*

It will be appreciated that the present method is susceptible of numerous other applications.

For example, an extension of the foregoing procedure for non-destructively testing sealed containers or other sealed systems for unwanted leaks is the testing or checking of systems having specifically designed controlled leaks. Thus, a sealed hollow system or the like may be deliberately formed with a fine opening through its wall to produce a controlled leak, e.g., a leak having a predetermined leakage rate under predetermined temperature and pressure conditions. To test the accuracy of such a leak, the system is subjected to the procedures outlined above, the tempertaure and pressure of the fluidic matter in which the system is immersed being made to correspond to the temperature and pressure for which the controlled leak has been calibrated. The net high range radiation count obtained from the system is converted into a quantitative measurement of leakage rate through the application of the calculational procedures previously referred to, and this leakage rate is compared with the stated leakage rate of the system.

The invention further contemplates certain refinements of the present method to enable locating of the leaks, if any, in sealed containers or other sealed hollow systems and surface connected cracks or other surface connected flaws, if any, in the walls of such systems.

To locate leaks in sealed containers or other sealed hollow systems, the latter are subjected to the steps previously described in connection with the testing of such containers or systems for leaks. In this case, the fluidic matter in which the system is immersed is preferably under greater pressure than the internal pressure of the system to assure a substantial leakage rate into the system if a leak exists. Also the system may desirably be immersed for a relatively long period of time to permit the entrainment of a realtively large number of molecules of the tagged matter.

After the system has been so immersed, and subjected to external decontamination, if desired, it is preferably placed in an evacuation vessel, or the like, to permit the external pressure to be reduced below the internal pressure of the system so as to encourage or establish reverse flow of any molecules of matter entrained within the system to the exterior of the latter through the openings which originally permitted entry of such molecules into the system during immersion thereof.

While the system is in this atmosphere of reduced pressure, a radiation sensitive probe 30 of a radiation counter 31 (FIG. 7) is moved over the surface of the system 10 to locate points of increased or maximized radiation count. These points, of course, will correspond to the points of the surface having leakage openings through which the molecules entrained in the system are undergoing reverse flow to the exterior of the system.

In some cases it may be difficult to locate the leaks by the aforementioned use of a radiation sensitive probe owing to the smallness of the leak. In such cases, it may be desirable to employ radiographic techniques. Thus, a film 40 having an emulsion which is primarily sensitive to the radiation utilized is wrapped around the system 10, as shown in FIG. 8. The film will, thereby have formed thereon latent images spatially corresponding to the points of the surface of the system having said openings through which the aforesaid reverse flow of the entrained molecules occurs.

In the usual case of this type, i.e., leak detection and location by reverse flow technique, particularly where a test is being made for the extent of the leak, as well as for its location, radioactive atoms productive of both high and low range radiations will be used. It will be noted that the high range radiations present are least effective in locating the site of the leak, since they are highly penetrative of the wall, and the effect of radiation concentration at the site of the leak is only moderately increased due to reverse flow. The high range radiations thus tend to mask the effect of the leak on a sensitive film, for instance. However, as is well known, the effect of high range radiation such as gamma rays on sensitive film is not nearly as great as low range radiations such as alpha or beta rays. Accordingly, it is preferable, for purpose of locating the leak, to include radioactive atoms of low range, as these are strongly stopped by the film, and hence give a well defined indication of the location of the leak notwithstanding some degree of masking by high range radiation.

It will be seen that in such case, the film is being masked in correspondence with the leak by radiations emanating from molecules located near the surface, directly within the crack or opening of the wall of the system or object under test, as well as and particularly from those molecules flowing outwardly from the crack or opening at the point of intersection of the latter with the external wall surface of the system. It will further be seen that for cases in which leak location, and not the extent of the leak, is the only problem, it will, for the above reasons, generally be most desirable to use only low radiation molecules. The same principles will of course apply when a sensitive probe is employed. It may also be mentioned at this point that any radiation detecting device may be employed in this application of the invention, as well as the others described in this specification. Presently known forms of such devices include, in addition to the sensitive film and probe mentioned above, directional or collimated probes, and fluorescent or scintillation screens or coatings capable of marking the location of the leak. Various other methods of radiation detection may of course be employed, as will be readily understood by those skilled in the art.

The leak locating technique described in the immediately preceding paragraphs is applicable also to hollow sealed system into which there has been introduced, at the time of their manufacture or filling, a given amount of fluidic matter, or matter which will become fluidic upon standing or other treatment, which matter is capable of emitting or producing, or being induced to emit, detectable radiation (either Group A, B, or C).

In lieu of basing the locating of leaks in sealed systems on such reverse flow detection techniques, the locating of leaks may be based on the fact that the surface connected openings through which leakage into the system occurs will contain an accumulation of molecules of the fluidic matter in which the system is initially immersed, due, for example, to the adherence of such molecules to the wall of the opening. These accumulations will be indicated by increased radiation intensity which may be detected and located by any of the radiation detection methods previously described. High and/or low range radiations may be used, depending upon the specific problem in hand; but for cases in which the location of a crack or opening where it pierces the surface is sought, low range radiations are most suitable, as previously noted.

It will be apparent that the above described accumulations of molecules will occur not only in openings which pass entirely through the wall of the system but also in surface cracks, fissures, surface connected voids, or other defects or flows which extend only part way through the wall. These latter molecular accumulations may be located, and hence such cracks and fissures located, by the foregoing procedures as will presently be made more clear in a description given hereinafter of an application of the present method to the determination of the permeation or absorption of molecules or fluidic matter into a body of solid material.

Often a complete sealed hollow system comprises a series of individual sealed system components, as for example, a device comprising a plurality of bellows or a single bellows divided into a plurality of sealed compartments. The present method is uniquely applicable to the determination of which bellows or which compartment of a compartmented bellows has a leak. Thus, after submission of said complete system to the procedures outlined relative to the testing of sealed systems for leaks, a difference in the net high radiation counts from the several systems or from the several compartments of a compartmented system may serve as the indication of the faulty system or compartment. In the alternative, of course, the previously described reverse flow detection technique or molecule accumulation technique can be employed to determine the faulty system or compartment of said complete system.

In another example, the present method is employed to test various solid materials for penetrability, e.g., porosity, to fluidic matter, either gaseous, liquid, or finely divided solid matter. In one example of such applications, the test materials are formed into sealed containers and subjected to the procedures for testing sealed systems for leaks whereby the net high range radiation count obtained becomes indicative of the extent of the penetration of the material under test by the fluidic matter employed.

In a further practice of the present method, the permeation or absorption of molecules of fluidic matter into a body of solid material may be determined. A body of solid material might appear in enlarged section as illustrated in FIG. 9 wherein the material is shown as having natural, surface connected interstices or pores 50 and surface connected defects such as minute cracks 51 or the like.

To determine the permeability of such material to a given fluidic matter, a body composed of the material is immersed in or exposed to the matter after the latter has been tagged in the manner outlined with respect to the testing of sealed systems.

During this immersion or exposure, molecules of the fluidic matter may permeate the interstices, cracks, or other openings through the surface of the test material, due to an established pressure differential, or the kinetic energy and motion of the molecules or capillary action. These molecules become entrained within the material.

After removal of the test material from the fluidic matter, the surface of the material may, if desired, be decontaminated in accordance with the procedures previously described. Finally, the entrained molecules are detected, measured, and or located by measuring the intensity of radiations emanating from the material, in the manner indicated with respect to the testing of sealed systems, making use of any of the detection and/or location techniques referred to hereinbefore.

It will be apparent that the above procedure is ideally suited to the testing or checking of structural members or the like, such as castings, for cracks, surface connected voids or other surface connected flaws. Thus, a net high radiation count from a casting, for example, which is greater than that expected due to the absorption of the tagged matter into the natural pores of the casting, will be indicative of surface connected flaws in the latter. The invention also contemplates the location of these flaws as will be presently shown.

As in the previously described tests, a high range radiation emitter only may, if desired, be employed in such permeation tests in which case the radiation count obtained will be due to those molecules which have permeated the material as well as to those molecules which adhere to the surface of the material. If the decontamination procedures, when employed, are known to be sufficiently effective, the error introduced into the radiation count by the surface contaminants may be considered to be negligible and such count may be taken as being indicative of permeation of matter into the material.

If, however, greater test accuracy is desired, both high and low range radiation emitters are employed for the purpose of accurately ascertaining the extent of surface contamination.

Thus, it will be apparent from an inspection of FIG. 9 that owing to the circuitous shape of the interstices and cracks in the material, the low range radiations emitted by those of the radioactive molecules which permeate the test material to a substantial depth are absorbed in or stopped by the material and hence are not detectable externally of the latter. The low range radiation count obtained is, therefore, due primarily to the surface contaminants. Knowing this low range radiation count, accordingly, and the aforementioned emission ratio of the high and low range radiations, the intensity of the surface high range radiations is ascertained and then deducted from the total high range radiation count to obtain a net high range radiation count indicative of the permeation of fluidic matter into the material.

The invention contemplates certain refinements of the present method as applied to permeation determinations. Thus, in certain applications, a radiation counter 60 incorporating a radiation sensitive probe 61 is employed, as indicated in FIG. 10. In such an arrangement, the probe is, as in the previously described application of locating leaks in sealed systems, moved over the surface of the test material 62 to locate points of increased radiation counts. These points correspond to surface connected voids or interstices of relatively large dimensions which contain accumulations of relatively large numbers of molecules of fluidic matter. It will be apparent, therefore, that the present method may be employed to locate surface communicating flaws such as voids or fissures in structural members, such as castings, for example, as is presently and only imperfectly accomplished through the utilization of bulky and costly equipment.

In the alternative, radiographic techniques may be employed, as the case of locating leaks in sealed systems. Thus, a film 70 having an emulsion which is primarily sensitive to the radiations utilized is wrapped around the test material 71, as indicated in FIG. 11. The film will, thereby, have formed thereon latent images spatially corresponding to concentration of molecules in the material.

When the problem is primarily leak location, either high or low range emitters may be used, or both together, but low range emitters are generally most advantageous by reason of the masking effect of high range radiation, as described hereinabove.

Still a further application of the invention is the detecting and/or locating of the penetration of tagged particles or pellets of matter into a test object as where it is desired to determine the penetration of particles of a projectile into a target which has been impacted by the projectile. In such cases a radiation sensitive probe is moved over the surface of the object or the aforedescribed radioagraphic techniques applied to locate the penetrated particles.

It is to be understood that the methods and instrumentalities hereinbefore described and illustrated are for illustrative purposes only, and that numerous modifications in design, arrangement, and procedure may be made without departing from the spirit and scope of the following claims.

The invention claimed is:

1. A method for testing a body for leakage to an interior surface-connected opening, comprising the steps of: providing fluidic matter made up at least in part of molecules having atoms capable of yielding detectable high penetrability and low penetrability nuclear radiations of known emission ratio, exposing the body to said fluidic matter; removing said body from exposure to said fluidic matter; and subsequently selectively detecting said high and low penetrability radiations emanating from the body whereby the radiations emitted solely by those molecules which have leaked into said opening may be ascertained.

2. The method according to claim 1, including the further step of decontaminating the external surface of said body after removal from exposure to said fluidic matter.

3. A method for determining the penetration of fluidic matter into interior surface-connected defects of a solid body, comprising steps of: providing fluidic matter made up at least in part of molecules having atoms capable of yielding detectable high penetrability and low penetrability nuclear radiations in a known emission ratio, exposing an exterior surface of said body to said fluidic matter, removing the body from exposure to the fluidic matter; measuring the intensity of the high penetrability radiations emanating from the body owing to those of said molecules which have penetrated into the body during said exposure and also owing to those which have adhered to the external surface of the body; and measuring the intensity of the low penetrability radiations owing to those of said molecules which have adhered to the external surface of the body, whereby the radiations solely from those of said molecules which have penetrated into the body may be determined.

4. Method of testing a body for the presence of minute fluid-receiving passages comprising applying to the body a fluid containing matter capable of yielding, in known ratio, radiations of relatively low penetrability and radiations of distinctively higher penetrability, ceasing said application of said fluid, measuring said low penetrability radiations emanating from said body, and measuring said high penetrability radiations emanating from said body.

5. The subject matter of claim 4, wherein said matter contains unstable atoms whose decay is accompanied by emission of said radiations of relatively low and distinctively higher penetrability.

6. The subject matter of claim 4, wherein said matter contains unstable atoms which decay to produce radioactive daughter atoms from which said radiations are emitted.

7. The subject matter of claim 4, wherein said matter contains atoms which yield said radiations upon bombardment of their nuclei by certain radiations of high penetrability, and including the additional step, following cessation of said application of said fluid, of bombarding said matter which has entered into said passages by said last-mentioned radiations of high penetrability.

8. Method of claim 4 comprising comparing the ratio between said measurements with said first-mentioned ratio to determine the amount of said fluid in said body.

9. Method of claim 4 comprising washing said body after said cessation to remove some of said fluid from the surface of said body.

10. A method for testing a series of sealed containers for leakage comprising the steps of selecting a fluid which emits substantially only particulate radiations, sequentially immersing the containers in the selected fluid, sequentially removing the containers from the fluid, sequentially decontaminating the containers, sequentially detecting the electromagnetic radiations emanating from within the containers as a result of the emission of particulate radiations by that portion of the fluid which has leaked into the containers and measuring the particulate radiations emanating from selected ones of the containers, whereby the proportion of electromagnetic radiations corresponding to the particulate radiations measured can be determined.

References Cited in the file of this patent

UNITED STATES PATENTS

| 2,751,506 | Black et al. | June 19, 1956 |
| 2,811,650 | Wagner | Oct. 29, 1957 |
| 2,869,642 | McKay et al. | Jan. 20, 1959 |
| 2,968,721 | Shapiro et al. | Jan. 17, 1961 |

OTHER REFERENCES

Linder, Abstract of Application, Serial No. 90,331, published Feb. 27, 1951, 643, O.G. 1333.

Arthur, Abstract of Application, Serial No. 206,829, published Feb. 26, 1952, 655, O.G. 1177.